United States Patent
Rousu et al.

(10) Patent No.: US 8,787,855 B2
(45) Date of Patent: Jul. 22, 2014

(54) METHOD FOR ARRANGING TUNING PARAMETERS TO AN RF RADIO MODULE

(75) Inventors: Seppo Rousu, Oulu (FI); Juha Valtanen, Oulu (FI)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/301,195

(22) Filed: Nov. 21, 2011

(65) Prior Publication Data
US 2013/0130634 A1 May 23, 2013

(30) Foreign Application Priority Data

Nov. 17, 2011 (GB) .................................. 1119885.0

(51) Int. Cl.
*H04B 1/18* (2006.01)

(52) U.S. Cl.
USPC ...................... 455/150.1; 455/41.3; 455/550.1

(58) Field of Classification Search
USPC .............. 455/41.2, 41.3, 150.1, 151.1, 151.2, 455/550.1, 551, 556.1, 557, 558
See application file for complete search history.

(56) References Cited

U.S. PATENT DOCUMENTS

| 5,697,068 A | 12/1997 | Salvi et al. ...................... 455/76 |
| 7,881,680 B1 | 2/2011 | Viehweg et al. ............ 455/114.3 |
| 2003/0163656 A1 | 8/2003 | Ganton .......................... 711/154 |
| 2009/0286493 A1 | 11/2009 | Viaud et al. ................... 455/90.2 |
| 2009/0298440 A1 | 12/2009 | Takeya et al. ............... 455/67.14 |
| 2010/0040124 A1 | 2/2010 | Wurth ........................... 375/222 |
| 2010/0144286 A1 | 6/2010 | Sorensen ........................ 455/73 |
| 2012/0077451 A1 * | 3/2012 | Strohmaier ................... 455/142 |
| 2012/0302189 A1 * | 11/2012 | Han et al. ................... 455/192.2 |

FOREIGN PATENT DOCUMENTS

| CN | 101753156 A | 6/2010 |
| JP | 2007286670 A | 11/2007 |

OTHER PUBLICATIONS

WO 2011/010853.*

* cited by examiner

*Primary Examiner* — Nhan Le
(74) *Attorney, Agent, or Firm* — Stanton IP Law

(57) ABSTRACT

A mechanism for providing tuning values to an RF radio module that, does not have memory for storing tuning values. Tuning values are requested from a server maintaining tuning values. The request is made by a device including the RF radio module for which the tuning values are requested. Requested tuning values are then received in accordance with the request. The received tuning values are stored in to a memory of the device including the RF radio module and applied to the RF radio module.

17 Claims, 3 Drawing Sheets

METHOD FOR ARRANGING TUNING PARAMETERS TO AN RF RADIO MODULE

FIELD OF THE INVENTION

The invention relates to radio communication devices.

BACKGROUND OF THE INVENTION

Radio communication capable devices must meet several different purpose requirements. Reasons are typically derived from standards, product requirements, type approval requirements, functional requirements for correct assembly and other safety regulations. Recently radio network and other communication have been introduced to a variety of different devices, for example, it is common that modern consumer electronics, including automotive, may have a plurality of devices that are capable of communicating wirelessly. In practice any modern electric device may be capable of communicating wirelessly. As an RF radio module as such may be a small portion of a device it is reasonable to manufacture RF radio modules that are placed into a host device. This kind of host device may be smartphone, tablet, water meter, electric power consumption meter or other similar special purpose device having wireless communication capability.

Wireless communication radio modules, such as RF and BB blocks, are tuned, aligned/calibrated and tested in production in order to take into account active and passive components, signal delays, printed wired board, interfaces, product configuration characteristics, application characteristics and requirement deviations that may be caused by the host device, where module will be taken into use. Baseband (BB) calibrations are performed, if necessary, to make HW platform to fulfill functional and performance requirements. These may be for example energy management calibrations and/or ADC calibrations for accuracy improvements. The electrical performance of the RF components varies a lot by nature. The objective of the RF tunings is to calibrate away this natural variation so that regulatory requirement for electrical performance and product requirements can be met. RF tuning is a process by which values for specific compensation parameters used inside the RF device driver, firmware or other special purpose electrical blocks are determined. Calibrations are performed to align RF performance to a predefined acceptable level which otherwise would not be achievable due to sample to sample variations of RF components. The number and type of parameters that need calibration are different for each RF architectures and RF system implementations. Some general examples of special purpose calibration parameters include RX AGC parameters (e.g. for 2G/3G/LTE), TX power parameters (e.g. for 2G/3G/LTE), AFC parameters, interoperability parameters and other special purpose parameters for performance improvement. RF tunings may be done either with external test equipment or by using a special purpose self-tuning methodology built in the hardware. The number of tuning values in an RF radio module depends on the number of supported communication systems, supported bands, number of receiver paths, number of transmission paths, supported band widths, data classes, antenna interfaces, interoperability requirements, tunable special purpose components e.g. filters other non-cellular wireless systems supported in same module/device, shielding arrangement etc. Tuning values may be stored in ASCII-format or other special purpose format, which is defined by system architecture. It is understood that the number of needed tuning/calibration values and format have requirements to the needed size of memory.

In different phases of production chain there may be testing phases, which may validate functionality, calibration values validity, assembly verification etc.

Appropriate tuning values are essential for fulfilling requirements mentioned above. For example, if host device would not pass type approvals without appropriate tuning values the host device could not be sold for public before tuning and/or calibration. Tuning and/or calibration test results and values are used to define and calculate each special purpose tuning values for each device in volume production. The correct tuning values are stored in a memory within the RF radio module. Typically the memory may be a flash memory or corresponding non-volatile memory. As the tuning values vary between different modules and devices where modules are used, there may be a need to store a plurality of different tuning values that are identified, for example, by using a production ID, product code or similar special purpose identification method. These production ID's may contain numbers, alphabetical characters, figures or it may be special purpose combination of methods.

As above mentioned RF radio communication modules/modems are a common component in modern technology. Thus, there is a continuous need to make them cheaper, smaller and more flexible in order to facilitate better into host device design with cheaper construction.

SUMMARY

The invention discloses a method for providing tuning values to an RF radio module, wherein the module does not have memory suitable for storing tuning values. In an embodiment of the invention tuning values are requested from an external device maintaining tuning values. Typically this external device is a server, however, other suitable means, such as memory sticks, ordinary computers and similar may be used. The request is made by a device comprising the RF radio module for which the tuning values are requested and will be used in operational communication. Requested tuning values are then received in accordance with the request. The received tuning values are stored into a memory of the device comprising the RF radio module and applied to the RF radio module use.

The embodiment described above is performed in a device to which the RF radio module is placed. In the requesting step it is possible to use a device or RF radio module special purpose identification code due to tuning values tend to be module specific. This special purpose radio module identification code may be a single code or it may be combined from multiple identification elements. Further identification code may be build up from the identification element or multiple elements with key and/or algorithm providing increased security. As an example identification code or identification element may be connected at least one of the following: information connected to module, information connected to components, information connected to labels in module, information hardware coded to components, information located on memory of components (e.g. OTP one time programmable memory), SIM ID of module, or corresponding where information is available in electrically, programmable or visually readable format. In a further embodiment the received tuning values may be tested using the received tuning values in at least one of methods in communication against tester or/and with self-testing features built in module and/or with test equipment and/or other radio and/or network.

In an embodiment device may contain system in package module which further have at least RF radio module, modem processor, modem SW executable memory and interface between implemented blocks, and external interfaces including antenna interfaces and interfaces to device. Modem SW may be stored to modem SW executable memory or other memory which may be for modem SW only or shared functionality. For operation RF radio module RF tuning parameters may be provided via special purpose interface at least one of modem SW executable memory, modem SW memory, memory with shared functionality, external memory, device memory where SIP module is connected or external server.

If the validation of received tuning values is successful the tuning values have been received and applied appropriately. Information of the installation of a module to a host device may be informed at least one of any special purpose server, server maintaining tuning values, server maintaining application software, server maintaining modem software. Further shared information may contain host device identification, location information, environmental information, owner information, installation time information, SW versions at installation or any other special purpose information which may be used later e.g for maintenance purposes, failure mechanism effect analysis, replacement need analysis, software update need analysis.

In an embodiment of the invention manufacturing of an RF radio module is included. The RF radio module is manufactured in a manner that there is no physical connection to a memory suitable for storing tuning values.

In a further embodiment of the invention manufacturing of a device comprising an RF radio module is included. Then tuning values for the device can be determined. Determined values are then stored to a server from which they can be downloaded for further special purpose use. Tuning values are by nature RF radio module specific, however, it must be noted that the host device and environment may have an effect to these values. This host device/environment effect may be as example device data class, device power class, device MIMO class, device carrier aggregation capability in downlink, device carrier aggregation capability in uplink, required interoperability performance, isolation between antennas, number of antennas available, number of antennas in special purpose antenna module, supported operational bands, insertion loss between module antenna connectors, supplier/vendor and antennas, type of host device, environmental temperature of device, and corresponding features and environmental items. It is also possible that the host device has a plurality of RF radio modules each having their own tuning values. Thus, RF radio modules may be assigned identification code. When tuning values are retrieved from a server identification code can be used for retrieving correct set of tuning values for each of the RF radio modules use.

In an embodiment of the invention the above mentioned methods are performed by using one or more computer programs. In an embodiment the computer program is executed in a device or SIP comprising an RF radio module. The computer program is configured to request and receive tuning values from a server. In a further embodiment the computer program is configured to use identification code in requesting and retrieving. Received tuning values are then applied to the RF radio module and the computer program may then communicate in order to verify successful retrieval of the tuning values.

In an embodiment of the invention an RF radio module is disclosed. The RF radio module is connectable to a host device comprising an external memory or alternatively multiple special purpose memories, special purposes application software memory, special purpose modem software memory. Furthermore, the RF radio module comprises an interface for accessing said external memory. The interface is configured to receive tuning values from the memory of the host device or other external memory. In an embodiment of the invention RF radio module does not comprise memory for storing tuning values. An example of suitable memory for storing values is flash memory. Other similar non-volatile memories that can be electrically erased and reprogrammed may be used. This kind of memory is costly and requires space and thus, it is a benefit of the invention that is not needed in an RF radio module according to the present invention. Alternatively it is an advantage if the number of different memories can reduced in RF radio module.

In a further embodiment of an invention the radio module or component(s) may comprise one time programmable memory configured to store an identification code. In a further embodiment of the invention the RF radio module is implemented as or in a system-in-a-package (SIP).

In an embodiment of the invention an apparatus comprising an RF radio module similar as described above is disclosed. In addition to the RF radio module the apparatus comprises connectivity means and memory. The apparatus is configured to provide tuning values to said RF radio module from said memory. In the embodiment the apparatus is further configured to retrieve tuning values for the RF radio module by using connectivity means, store tuning values to the memory and apply tuning values to the RF radio module from the memory. In an embodiment of the invention the apparatus is further configured to validate tuning values by performing self-testing procedure. In a further embodiment of the invention the apparatus further comprises a processor for executing computer programs and the processor is configured to execute a computer program that is arranged to retrieve, store and apply said tuning values.

In an embodiment of the invention connectivity means is at least one of the following: a serial port, a fixed network connection or a wireless connection. In a further embodiment of the invention the wireless connection is using the RF radio module with default tuning values. Above mentioned connectivity means may be used for retrieving in different phases of the life cycle of the apparatus. For example, tuning values may be provided by using a serial port, such as a USB-port, at the manufacturing facility or tuning values can be retrieved when the device is started first time. When using the RF radio module for retrieving tuning values it must be noted that the RF radio module might not fulfill all type approvals and safety requirements when appropriate tuning values have not been applied.

In an embodiment of the invention a system comprising manufacturing line, a server and an apparatus is disclosed. The apparatus is manufactured in the manufacturing line. During the manufacturing process tuning values are determined. Tuning values are then stored to the database that are then retrieved to the device or SIP. Retrieved tuning values are then applied to the RF radio module of the apparatus and stored to the memory of the apparatus for later use.

In an embodiment RF module or SIP may contain at least one of processor for modem communication SW execution, RAM (e.g. SRAM, DDR) as software execution memory, software executable memory (e.g. NOR) RF transceiver and RF frontend components, antenna interface(s), energy management, reference clock. Processor may have interface to host device. Modem software may be stored at least one of software executable memory in RF module or SIP, software executable memory in host device, flash memory in host device.

In one embodiment modem SW may be stored to host device memory, it needs to be prior communication to be loaded to RAM memory of RF module or SIP. Loading need to be happen via suitable interface between RF radio module or SIP processor and host device flash memories. This same interface may be used to load RF tuning values from host device flash memory to SIP or RF radio module RAM memory.

In alternative embodiment modem SW may be stored to SW executable memory of RF module or SIP. RF radio module or SIP needed tuning values may be stored at least one of SW executable memory in SIP/RF radio module or flash memory in host device. According special purpose SW architecture modem SW execution may be shared between SW executable memory and RAM. In an alternative embodiment modem SW and execution may be located in one of the host device memories.

The benefit of the above mentioned invention is that it simplifies the RF radio module design as the previously needed memory for storing tuning values is not necessary anymore. This provides multiple benefits, such as, smaller, cheaper and more energy-efficient construction. These are significant benefits as RF radio modules are used in a wider scale of different technology areas and some end-user products may use a plurality of RF radio modules. For example, in a automotive RF radio module may be placed, for example, in a control unit, radio/dvd-player, navigator, phone for connected cars, Internet connection or similar. These modules may be used for human interaction or to machine type communications or device to device communication. Correspondingly RF radio modules may be found from home entertainment electronics, washing machines, office tools in SIP modules and similar.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
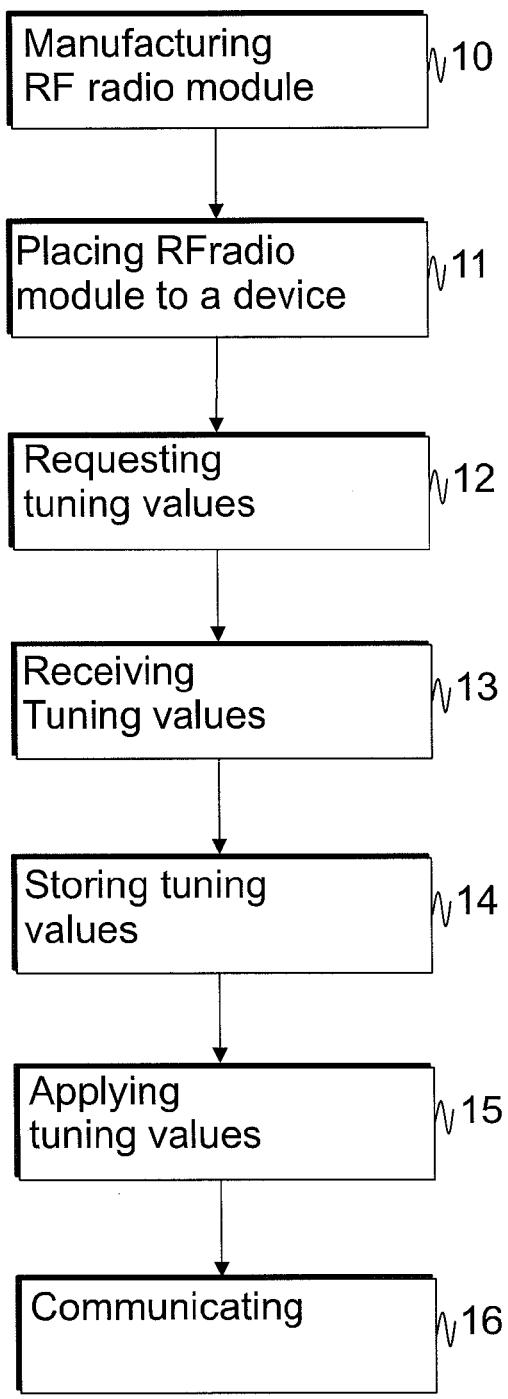
FIG. 1 is a flow chart of an embodiment according to the present invention.

In FIG. 1 a flow chart of an embodiment according to the present invention. The embodiment of FIG. 1 discloses a manufacturing method in which a device according to the present invention is manufactured. In the method the first an RF radio module is manufactured, step 10. In the present embodiment RF radio module is manufactured as a system-in-a-package (SIP) module, however, other type of modules could be used. The RF radio module is manufactured without tuning values and it does not have memory suitable for storing the tuning values. Instead of the memory the RF radio module is capable of communicating/testing with external memory from which tuning values may be retrieved before the device is used or alternatively testing can be done with default tuning values with modem SW operation.

The manufactured RF radio module(s) is/are then sent to the client who will place it/those to their own product, step 11. Product may have single or multiple RF modules. In an embodiment single memory may contain RF tuning values of multiple RF radio modules. It must be noted that in the example of FIG. 1 a production device is being manufactured. When a prototype or preproduction devices are being manufactured the method further comprises determining tuning values and storing tuning values to a database that can be accessed later. Tuning values may be equipped with an identification code so that tuning values may be retrieved to a correct RF radio module.

As the tuning values are equipped with an identification code or with some other identification mechanism, it is possible to request appropriate tuning values for an RF radio module, step 12. It must be noted, that for the request some connectivity means must be available. For example, the device may have a computer program that is executed when the device is turned on. If the device is connected to a serial cable, such as a USB-cable, then the device automatically requests values using the serial cable. In an embodiment device may be SIP module containing RF radio module. All other available connectivity means may be used. Other means include but are not limited to conventional wired network connection, wireless network connection, power grid network, internet connection, adhoc-network or internet connection. Tuning values are requested from a server that can be located in public or private network/server. The RF radio module itself may also be used for requesting information, however, it must be noted that it is possible that the RF radio module may not pass type approvals and thus when using of RF radio module itself this must be taken into account, for example, by securing that public communications are not interfered, e.g. with Faraday chamber, shielded facility or corresponding. As some of the connectivity mean have limitations it is possible that they may be used only when manufacturing the device. However, it must be noted that if the device has separate means for requesting tuning values they may be requested when the end-user starts the device first time.

After requesting tuning values they are received at the device, step 13. Typically tuning values are received by using same connectivity means as for making the request. Received tuning values are then stored to the memory of the device, step 14. Stored tuning values are then applied to the RF radio module, step 15. It is possible to test applied RF radio module by making test communication, step 16. If the communication is successful the retrieval of tuning values has been successful. Steps 12-16 are typically implemented as computer program that is executed in the device when the device is started in the manufacturing process or by the end user, however, tuning values may be pre-stored to the memory during manufacturing and steps 12-14 described above is performed at the manufacturing facility. The computer program may be stored on a computer readable medium or retrieved from a network location.

In addition to the retrieved tuning values some of the components may have additional information stored into one-time programmable memory, such as component level information saved to the component to improve performance. For example, a power amplifier or special purpose RF component may have one time programmable memory which contains power amplifier manufacturing phase measured information, such as, gain, bias values, in-band noise, wide band noise, ACLR level, ACLR imbalance, and other similar that may be used in communication with other tuning values.

Figure 2:
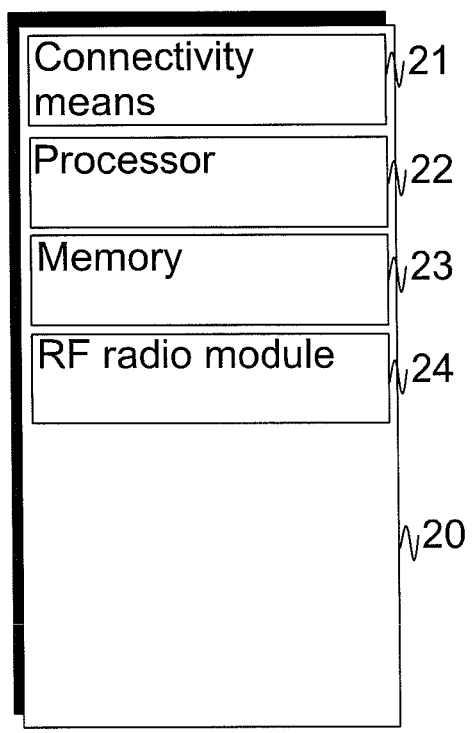
FIG. 2 is a block diagram of an example embodiment of an apparatus according to the present invention.

FIG. 2 discloses an example of a device according to the present invention. In the embodiment of FIG. 2 the device 20 may be a digital music player. The device 20 comprises connectivity means 21, a processor 22, a memory 23 and an RF radio module 24. Processor 22 may have modem and/or application execution capability. The device may and typically does have more components, such as a display, earphone plug, power source and similar. In the embodiment of FIG. 2 the components 21-24 are used to implement the method according to or similar to disclosed in FIG. 1.

Connectivity means 21 is typically at least one of the following: conventional wired network connection, wireless network connection, power grid network, internet connection, adhoc-network or Internet connection, however, it is possible also implement a device that does not have separate connectivity means and uses RF radio module 24 for retrieving tuning values via air interface. As the portions of the method described above are implemented as a computer software processor 22 is configured to execute such code in order to enable the retrieval process by requesting tuning values from a server. Tuning values received from the server are stored in the memory 23 of the device.

Figure 3:
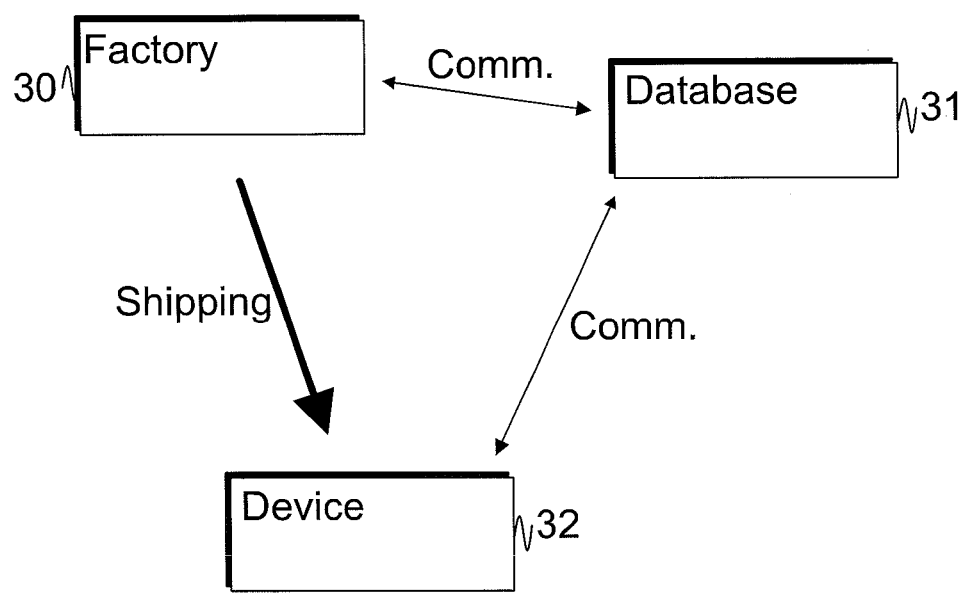
FIG. 3 is a block diagram of an example embodiment of a system according to the present invention.

In FIG. 3 a system according to a present invention is disclosed. The system comprises factory 30 for manufacturing devices that use an RF radio module according to the present invention. An example of such device is the device disclosed in FIG. 2. The system further comprises a database 31 for storing tuning values and a device 32 which has been shipped from the factory 30. In the embodiment of FIG. 3 tuning values are retrieved from the database 31 when the device is started first time by the end user. However, as mentioned before, tuning values may be retrieved also during manufacturing process. Tuning values may be retrieved to the same factory 30 where the device/SIP is first manufacture or at a fine tuning facility.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing special purpose instructions to a processor for execution. Such a medium can take many forms, including but not limited to, non-volatile media, volatile media, transmission media, and the like. Non-volatile media can include, for example, optical or magnetic disks, magneto-optical disks, USE sticks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method comprising:
determining tuning values for a radio frequency (RF) radio module or receiving determined tuning values for the RF radio module;
storing said determined tuning values to an external device;
using an identification code of the RF radio module to request the tuning values for the RF radio module from the external device maintaining tuning values, wherein the request is made by a host device comprising the RF radio module;
receiving said requested tuning values in accordance with said request; and
storing said received requested tuning values to a memory of the host device comprising said RF radio module, and applying said tuning values from the memory of the host device to said RF radio module in operation.

2. The method according to claim 1, wherein the method further comprises manufacturing said RF radio module.

3. The method according to claim 1, wherein the determined tuning values of the RF radio module are stored at the external device in association with the identification code for the RF radio module.

4. The method according to claim 1, wherein said determined tuning values are associated with the RF radio module via the identification code.

5. The method according to claim 1, wherein the method is executed after the RF radio module is inserted into the host device and before a first use by any end user.

6. A radio frequency (RF) radio module, wherein said RF radio module is connectable to a host device comprising an external memory and said RF radio module comprises an interface for accessing said external memory, wherein said RF radio module is configured to receive determining tuning values associated with an identification code of the RF radio module from the memory of the host device before a first use of the host device by any end user.

7. The RF radio module according to claim 6, wherein said RF radio module does not comprises memory for storing tuning values.

8. The RF radio module according to claim 6, wherein said radio module comprises one time programmable memory configured to store the identification code.

9. The RF radio module according to claim 6, wherein said RF radio module is a part of system-in-a-package.

10. A host device comprising:
a data communication connection;
a radio frequency (RF) radio module; and
a memory separate from the RF module;
wherein said host device is configured to:
use an identification code of the RF radio module to retrieve, via the data communication connection, tuning values that are determined for the RF radio module from an external device that maintains tuning values;
store in the memory the retrieved tuning values; and
apply the tuning values from the memory to the RF radio module in operation.

11. The host device according to claim 10, wherein said RF radio module does not comprise memory for storing tuning values.

12. The host device according to claim 10, wherein said RF radio module is a part of system-in-a-package.

13. The host device according to claim 10, wherein the host device is further configured to validate tuning values by performing self-testing procedure.

14. The host device according claim 10, wherein said data communication connection is a serial port.

15. The host device according claim 10, wherein said data communication connection is a fixed network connection.

16. The host device according to claim 10, wherein said data communication connection is a wireless connection.

17. The host device according to claim 16, wherein said wireless connection is said RF radio module using default tuning values.

* * * * *

UNITED STATES PATENT AND TRADEMARK OFFICE
CERTIFICATE OF CORRECTION

| | | |
|---|---|---|
| PATENT NO. | : 8,787,855 B2 | Page 1 of 1 |
| APPLICATION NO. | : 13/301195 | |
| DATED | : July 22, 2014 | |
| INVENTOR(S) | : Seppo Rousu and Juha Valtanen | |

It is certified that error appears in the above-identified patent and that said Letters Patent is hereby corrected as shown below:

In the Claims

Claim 6, column 8, line 35: Replace "RF radio module is configured to receive determining tuning" with --RF radio module is configured to receive determined tuning--.

Claim 7, column 8, line 40: Replace "RF radio module does not comprises memory for storing" with --RF radio module does not comprise memory for storing--.

Signed and Sealed this
Seventeenth Day of March, 2015

Michelle K. Lee
*Director of the United States Patent and Trademark Office*